(12) United States Patent
Mannis (10) Patent No.: US 10,308,407 B2
(45) Date of Patent: Jun. 4, 2019

(54) RELEASABLE RATCHET STRAP HAVING A LOCK MECHANISM

(71) Applicant: Michael Lee Mannis, Lecanto, FL (US)

(72) Inventor: Michael Lee Mannis, Lecanto, FL (US)

( * ) Notice: Subject to any disclaimer, the term of this patent is extended or adjusted under 35 U.S.C. 154(b) by 149 days.

(21) Appl. No.: 15/340,359

(22) Filed: Nov. 1, 2016

(65) Prior Publication Data

US 2018/0119458 A1 May 3, 2018

(51) Int. Cl.
| | |
|---|---|
| B65D 65/00 | (2006.01) |
| B65D 63/10 | (2006.01) |
| B65D 63/08 | (2006.01) |
| E05B 67/00 | (2006.01) |
| E05B 67/02 | (2006.01) |
| F16B 2/18 | (2006.01) |

(52) U.S. Cl.
CPC ......... *B65D 63/1036* (2013.01); *B65D 63/08* (2013.01); *E05B 67/003* (2013.01); *E05B 67/02* (2013.01); *B65D 2563/00* (2013.01); *B65D 2563/103* (2013.01); *B65D 2563/107* (2013.01); *F16B 2/185* (2013.01)

(58) Field of Classification Search
CPC .... E05B 73/0005; E05B 67/063; E05B 67/24; B65D 63/08; B65D 63/1036; B65D 2563/00; B65D 2563/103; B65D 2563/107; F16B 2/08; F16B 2/185
USPC .................. 70/14–16, 18, 19, 58, 17, 30, 49
See application file for complete search history.

(56) References Cited

U.S. PATENT DOCUMENTS

| | | | | | |
|---|---|---|---|---|---|
| 1,545,660 | A | * | 7/1925 | Johnson | E05B 69/003 70/18 |
| 3,933,015 | A | * | 1/1976 | Balicki | E05B 67/003 70/18 |
| 4,458,385 | A | * | 7/1984 | Espinoza | F16B 2/08 24/16 PB |
| 4,557,455 | A | * | 12/1985 | Benjamin | B65D 63/1072 24/16 PB |
| 5,447,043 | A | * | 9/1995 | Hwang | E05B 67/003 70/386 |
| 6,609,399 | B1 | * | 8/2003 | Daniels, Jr. | B62H 5/003 70/14 |
| 8,234,757 | B2 | * | 8/2012 | Lesley | A44B 11/16 24/170 |
| 8,556,555 | B2 | * | 10/2013 | Lesley | B60P 7/0838 410/100 |

(Continued)

*Primary Examiner* — Suzanne L Barrett
(74) *Attorney, Agent, or Firm* — Tiffany C. Miller; Inventions International Inc.

(57) ABSTRACT

A releasable ratchet strap having a plurality of strap teeth and a robust flexible inner core connected to a housing having a lock mechanism. A lever is hingedly connected to the housing. The housing retains a lock pin having at least one recess. The lock mechanism is oriented in an unlocked configuration when at least one recess of the lock pin is in alignment with a portion of the latch. When the latch is depressed, the latch tooth of the latch is released from contact with a strap tooth of the ratchet strap. When the lock mechanism is oriented in a locked orientation, no recess of the lock pin is in alignment with a portion of the latch. In a locked orientation, the lock pin obstructs the latch from hingedly pivoting and the latch tooth engages the strap tooth of a ratchet strap.

16 Claims, 8 Drawing Sheets

(56) References Cited

U.S. PATENT DOCUMENTS

| | | | |
|---|---|---|---|
| 9,021,681 B2 * | 5/2015 | Owen | B65D 63/1081 24/16 PB |
| 9,243,428 B1 * | 1/2016 | Miracle | E05B 71/00 |
| 9,663,975 B2 * | 5/2017 | Castro | E05B 67/24 |

* cited by examiner

RELEASABLE RATCHET STRAP HAVING A LOCK MECHANISM

BACKGROUND OF THE INVENTION

1. Field of the Invention

This invention relates, generally, to a releasable ratchet strap having a lock mechanism. More particularly, it relates to a releasable ratchet strap having a flexible inner core connected to a housing. The housing has a lock mechanism with a lock pin with at least one recess that is oriented in an unlocked configuration when the lock pin recess is in alignment with a portion of a latch and is oriented in a locked orientation when a recess of the lock pin is not in alignment with a portion of a latch.

2. Background Art

The ratchet straps in today's market can be either releasable or non-releasable. A releasable ratchet strap can be released by any individual having access to the ratchet strap. This unrestricted accessibility to the contents being retained by a releasable ratchet strap can lead to theft of valuable contents. Thus, there is a need for a releasable ratchet strap connected to a lock mechanism that releases the ratchet strap by an authorized user. Incorporating a keyed lock mechanism with a releasable ratchet strap will allow an authorized user having the corresponding combination or passcode to unlock the lock mechanism. A lock mechanism helps to protect an individual's personal property being retained by the novel releasable ratchet strap having a lock mechanism. Further, authorized users will have the ability to release and reuse the releasable ratchet strap having a lock mechanism and unauthorized users will not have the ability to release the releasable ratchet strap having a lock mechanism for access to retained contents.

Currently, non-releasable ratchet straps can only be released by cutting through the ratchet strap. This cutting of the ratchet strap destroys the ratchet strap and prevents the ratchet strap from being used a subsequent time. Thus, there is a need for a releasable ratchet strap having a flexible inner core made of a material that can be difficult to cut through including, but not limited to, steel or carbon fiber.

Many ratchet straps have a primary side being substantially flat and a secondary side having a plurality of ridges or strap teeth. The side of the releasable ratchet strap having the plurality of ridges must be facing toward the latch and the strap teeth must be oriented in the correct direction for the latch to engage a strap tooth. This tedious alignment of the strap teeth with the latch requires time and precision. Thus, there is a need for a quicker way to align the strap teeth of a ratchet strap with the latch without the need for such precision. There is a long felt need for an improved strap tooth that can engage a latch without having to precisely align the plurality of ridges with the latch.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a releasable ratchet strap having a plurality of strap teeth and a robust flexible inner core connected to a housing having a lock mechanism. A lever is hingedly connected to the housing. The housing retains a lock pin having at least one recess. The lock mechanism is oriented in an unlocked configuration when at least one recess of the lock pin is in alignment with a portion of the latch. In an unlocked configuration, the latch is free to hingedly pivot when the force of a user depresses an end of the latch into a portion of the at least one recess. When the latch is depressed, the latch tooth of the latch is released from contact with a strap tooth of the ratchet strap. When the lock mechanism is oriented in a locked orientation, no recess of the lock pin is in alignment with a portion of the latch. In a locked orientation, the lock pin obstructs the latch from hingedly pivoting and the latch tooth engages the strap tooth of the ratchet strap.

The novel ratchet strap has a proximal end located opposite a distal end. At least one strap tooth is connected to the ratchet strap. In a preferred embodiment, a plurality of strap teeth are connected to the ratchet strap. The proximal end of the ratchet strap is connected to a housing having a lock mechanism. The housing has a compartment retaining a lock pin and a resilient member including, but not limited to, a spring. The lock pin has a primary end located opposite a secondary end. The lock pin has at least one recess. The secondary end of the lock pin is in communication with the resilient member. For instance, the lock pin can be in direct contact with the resilient member or there can be a structure including, but not limited to, a washer, located between the lock pin and the resilient member.

The housing has a lever. The lever is hingedly connected to the housing. The lever has a primary end located opposite a secondary end. The primary end of the lever has a latch tooth configured to engage at least one strap tooth. The secondary end of the lever is configured for a user to depress the lever. The lock mechanism is oriented in a locked configuration when the latch tooth of the lever engages at least one strap tooth of the ratchet strap. No recess of the lock pin is aligned with the lever in a locked configuration.

The ratchet strap has a flexible inner core having a proximal end located opposite a distal end. The proximal end of the flexible inner core is connected to the housing. The distal end of the flexible inner core has an anchor structure fixedly connected. The anchor structure is retained within the anchor structure compartment of a strap tooth.

In a preferred embodiment, the strap tooth has a central bore. The central bore has an anchor structure compartment configured to retain the anchor structure of a flexible inner core. The central bore has a flexible inner core compartment configured to retain a portion of the flexible inner core. The anchor structure compartment has a larger perimeter than the flexible inner core compartment. A strap tooth can have an outer wall surface having a perimeter tapering from a larger perimeter to a smaller perimeter.

In a second embodiment, a ratchet strap can be extendable to increase the length of the ratchet strap. For instance, the distal end of a first ratchet strap is connected to a second ratchet strap. The second ratchet strap is non-releasable from the first ratchet strap.

In a third embodiment, a strap tooth can have a convex protrusion located on an end of the strap tooth located opposite an end having a concave recess. The concave recess of a first strap tooth receives the convex protrusion of a second strap tooth, whereby, orienting the concave recess of the first strap tooth to engage the convex protrusion of a second strap tooth forming a ball joint.

It is therefore an important object of the present invention to provide a housing having a resilient member orienting the lock pin to traverse at least a portion of the compartment of the housing so that at least one recess of the lock pin is aligned with a portion of the lever. The lock mechanism is oriented in an unlocked configuration when a portion of the lever is depressed and the latch tooth of the lever is released from contact with the strap tooth of the ratchet strap.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In a general embodiment the novel releasable ratchet strap having a lock mechanism can have a lock and key system. It is within the scope of this invention for a key to include, but not be limited to, a passcode, a combination, a digital code, a numerical code, a finger print identification system, a password system, a visual identification system, or a turn-key. An authorized user includes, but not limited to, an individual having the key or passcode to the keyed lock. In a preferred embodiment, an authorized user will use the key or passcode which enables the lock mechanism to orient at least one recess of the lock pin to align with a portion of the latch. This recess creates clearance for a portion of the latch to be depressed by a user to release the latch tooth of the lever from engaging a strap tooth of the releasable ratchet strap.

In a preferred embodiment, the latch of the releasable ratchet strap having a lock mechanism has a length great enough for a user to depress an end of the latch. More particularly, when the lock mechanism is positioned in a locked orientation, the latch tooth of the lever is positioned between a primary strap tooth and a secondary strap tooth. When a portion of the latch is located within a recess of the lock pin, the latch tooth of the lever is disengaged from the interconnection between a primary strap tooth and a secondary strap tooth of the releasable ratchet strap. In an alternate embodiment, the latch tooth engages a portion of at least one strap tooth.

In another embodiment, the releasable ratchet strap having a lock mechanism can have a robust flexible inner core made of a material including, but not limited to steel or carbon fiber. A steel core being located within a releasable ratchet strap having a lock mechanism can prevent an unauthorized user from cutting through the ratchet strap. It is within the scope of this invention for the releasable ratchet strap having a lock mechanism to be made of a flexible metal material.

Construction of the Novel Releasable Ratchet Strap

Figure 1A:
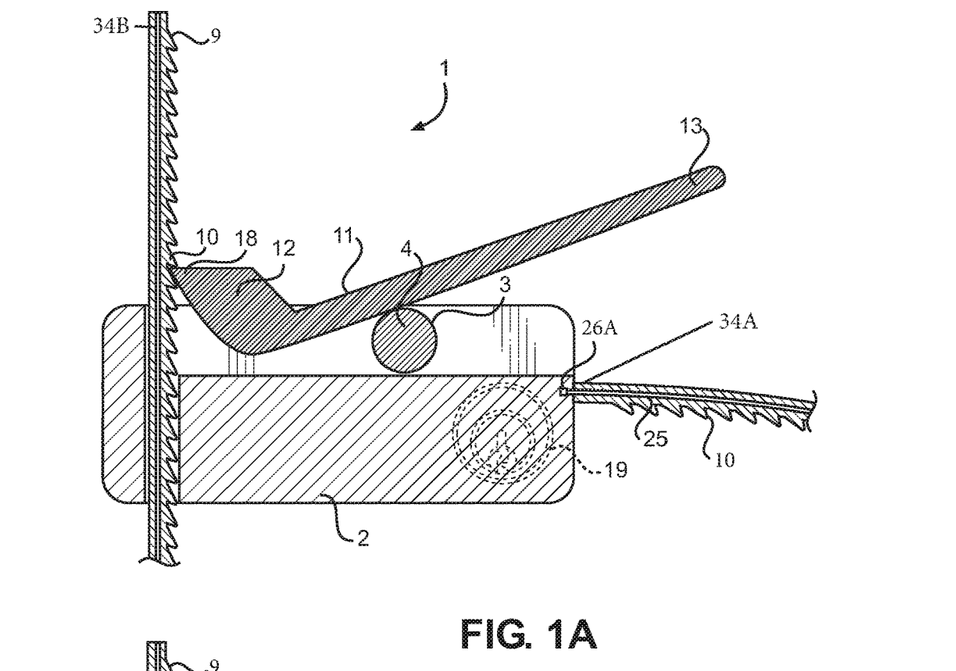
FIG. 1A is a side cut-away view of the novel releasable ratchet strap having a lock mechanism positioned in a locked orientation.
Figure 1B:
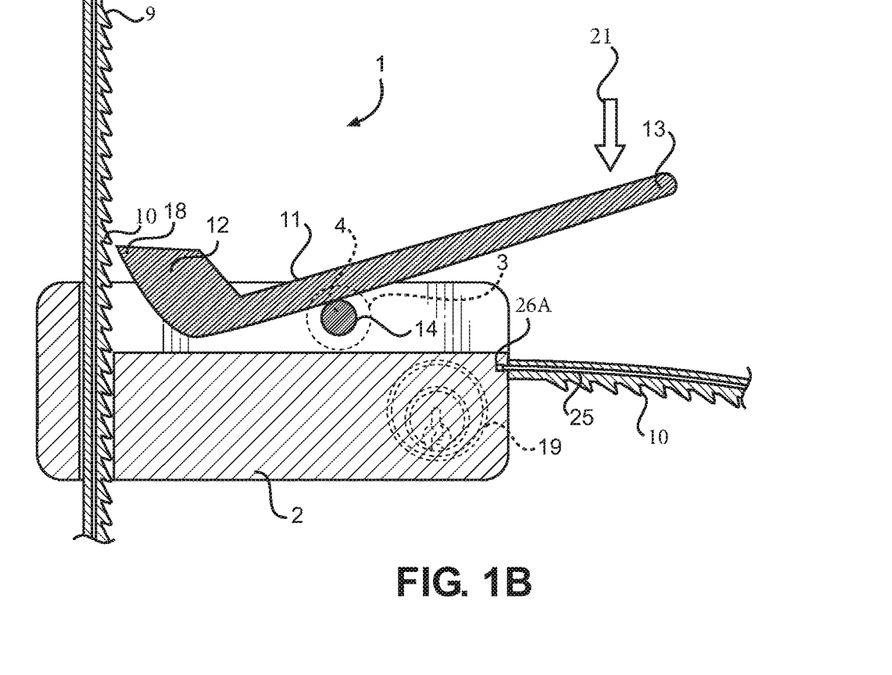
FIG. 1B is a side cut-away view of the novel releasable ratchet strap having a lock mechanism positioned in an unlocked orientation.
Figure 2:
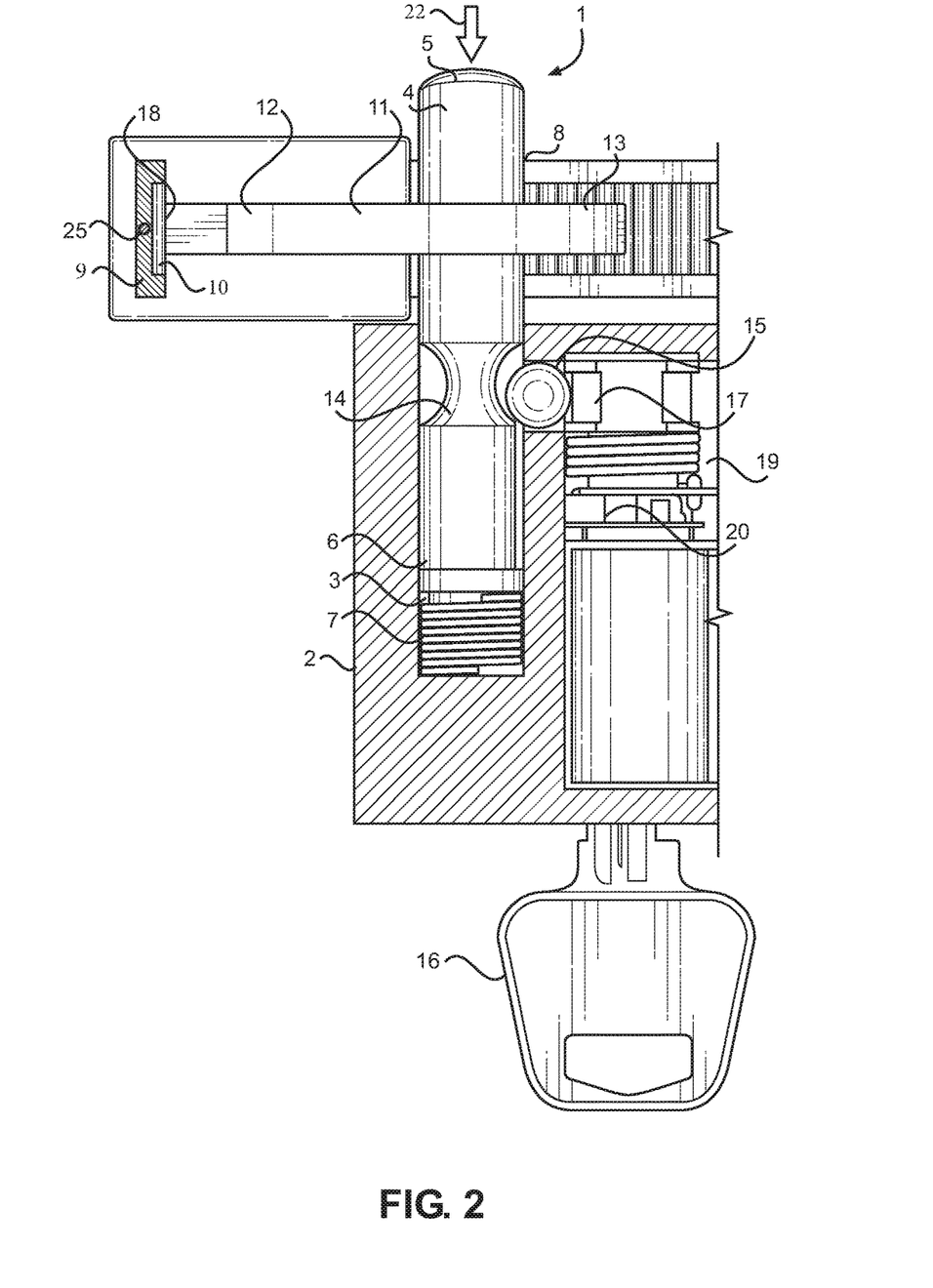
FIG. 2 is a top cut-away view of the novel releasable ratchet strap having a lock mechanism positioned in a locked orientation.
Figure 3:
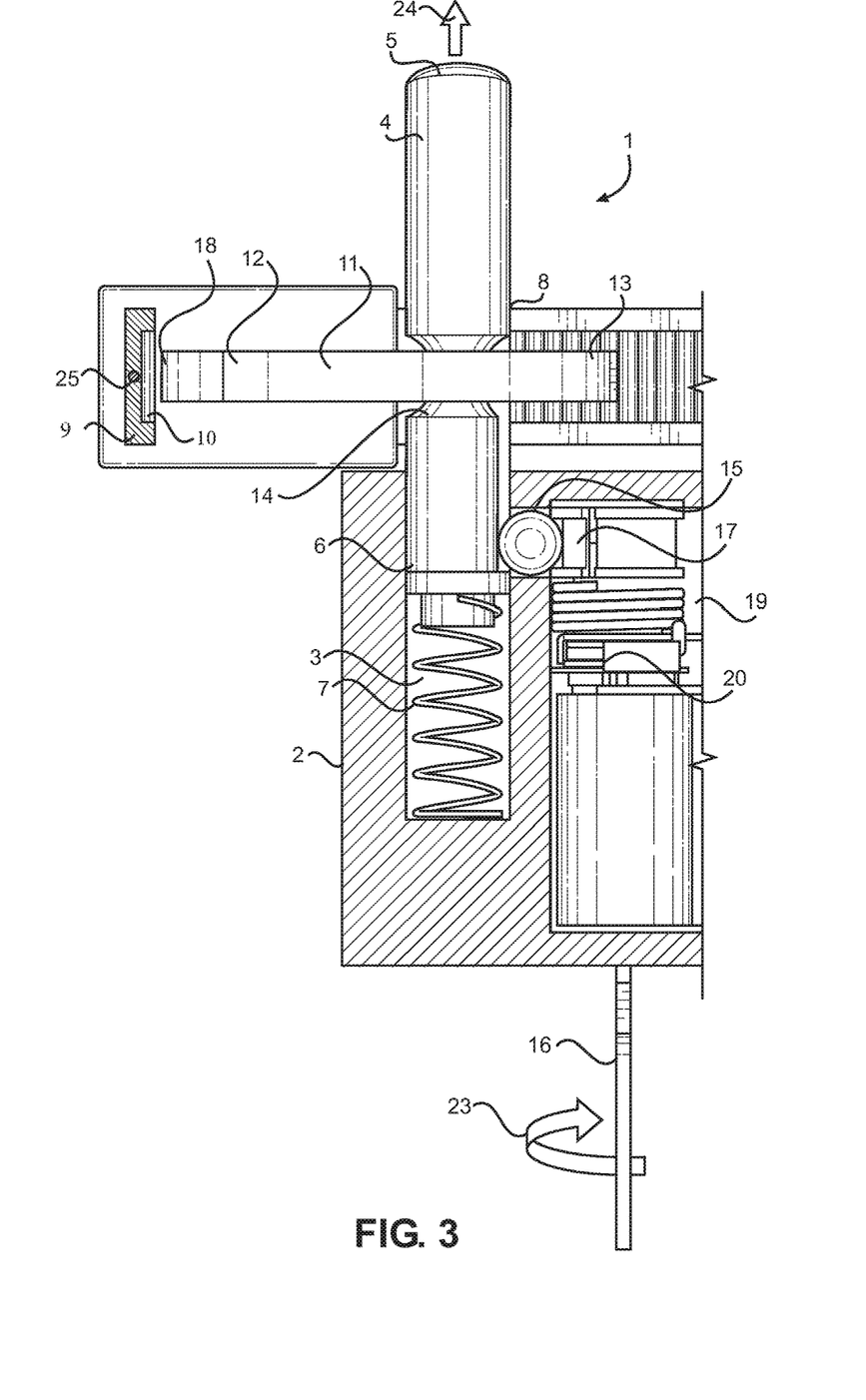
FIG. 3 is a top cut-away view of the novel releasable ratchet strap having a lock mechanism positioned in an unlocked orientation.

It will now be seen, referring to FIGS. 1-3, novel releasable ratchet strap having a lock mechanism 1 includes lock housing 2. Lock housing 2 retains components of lock mechanism 20 (FIGS. 2 and 3). Lock housing 2 has primary compartment 3. Primary compartment 3 can have primary compartment opening 8 (FIGS. 2-4). Lock pin 4 is retained by primary compartment 3. Secondary compartment 19 retains lock cam 17 (FIGS. 2-4). A releasable ratchet strap having a lock mechanism 1 has ratchet strap 9. Ratchet strap 9 has a surface having at least one strap tooth 10. Latch 11 has primary end 12 having latch tooth 18 located opposite latch 11 secondary end 13. Secondary end 13 of latch 11 is configured to be depressed 2 (FIG. 1B) by a user (not shown). FIGS. 1B and 3 depicts lock mechanism positioned in an unlocked orientation. In this unlocked orientation, latch 11 can be depressed because recess 14 of lock pin 4 is in alignment with latch 11. FIG. 1B shows the force 21 applied to latch 11 secondary end 13 which pivots latch 11 on recessed portion 14 of lock pin 4. Lock pin 4 is oriented in a locked orientation in FIGS. 1A-2 when no recess of the lock pin is in alignment with a portion of the latch. Lock pin 4 obstructs latch 11 from hingedly pivoting and cannot release latch tooth 18 of lever 11 from contact with strap tooth 10 of ratchet strap 9.

FIG. 1A illustrates ratchet strap 9 having a proximal end 34A located opposite a distal end 34B. Lock housing 2 is connected to proximal end 34A of ratchet strap 9. Lever 11 is hingedly connected to lock housing 2. Ratchet strap 9 has robust flexible inner core 25 (FIGS. 1A-3). An end of ratchet strap 9 can be connected to primary anchor structure 26A. In an alternate embodiment illustrated in FIGS. 1A and 1B, primary anchor structure 26A can connect flexible inner core 25 of ratchet strap 9 to lock housing 2.

FIG. 1B shows lock pin 4 being oriented in an unlocked orientation when at least one recess 14 (FIGS. 1B-4) of lock pin 4 is in alignment with a portion of latch 11. Latch 11 can hingedly pivot when the force 21 of a user (not shown) depresses an end 13 of latch 11. When lever 11 is depressed by a user, latch tooth 18 of lever 11 is released from contact with strap tooth 10 of the ratchet strap 9.

FIGS. 1-3 depict ratchet strap 9 of releasable ratchet strap having a lock mechanism 1 being substantially flat with one side of ratchet strap 9 having plurality of strap teeth 10.

FIGS. 2 and 3 depict primary compartment 3 retaining lock pin 4 and resilient member 7. Primary compartment 3 also retains a portion of lock jam ball 15. Lock pin 4 has primary end 5 located opposite secondary end 6. Secondary end 6 of lock pin 4 is in communication with resilient member 7. It is within the scope of this invention for resilient member 7 to include, but not be limited to, a spring. FIG. 2 illustrates primary end 5 of lock pin 4 protruding from primary compartment opening 8 (FIGS. 2 and 3) of lock housing 2. In an example, a user could depress 22 (FIG. 2) primary end 5 of lock pin 4 to engage lock jam ball 15 within recess 14 of lock pin 4 to position the lock mechanism in a locked orientation. In another example, a user could turn 23 a key 16 to position the lock mechanism in a locked orientation.

FIG. 2 shows lock pin 4 being positioned in a locked orientation when no recess of lock pin 4 is in alignment with a portion of latch 11. Lock pin 4 obstructs latch 11 from hingedly pivoting and prevents the release of contact between latch tooth 18 of lever 11 and strap tooth 10 of the ratchet strap 9.

FIG. 3 shows key 16 being turned 23 to position lock mechanism 20 in an unlocked orientation. The force of resilient member 7 abutting lock pin 4 allows lock pin 4 to traverse 24 at least a portion of the length of primary compartment 3 so that recess 14 of lock pin 4 aligns with a portion of latch 11. In an unlocked configuration, latch 11 can disengage interconnection between latch tooth 18 and strap tooth 10 of ratchet strap 9.

In an alternate embodiment, it is within the scope of this invention for lock pin 4 to be retained within primary compartment 3 of lock housing 2 in its entirety or in part. For example, lock pin 4 does not have to protrude from lock housing 2 when recess 14 of lock pin 4 is aligned with a portion of latch 11. Lock housing 2 could extend the entire length of lock pin 4.

FIGS. 2 and 3 both show lock pin 4 having recess 14. The perimeter of lock pin 4 is smaller in size at recess 14. FIG. 2 illustrates lock mechanism 20 of lock housing 2 positioned in a locked orientation in which the lock is engaged. A portion of lock jam ball 15 is retained within recess 14 of lock pin 4 when the lock mechanism 1 is locked. Latch 11 cannot be depressed because lock pin 4 obstructs movement of latch 11.

FIGS. 1A and 2 best show lock mechanism 20 of a releasable ratchet strap having a lock mechanism 1 being in a locked orientation. Latch tooth 18 of lever 11 interlocks with at least one strap tooth 10 of ratchet strap 9. Latch 11 cannot pivot due to lock pin 4 obstructing latch 11 from pivoting.

FIGS. 1B and 3 best illustrate lock mechanism 20 of a releasable ratchet strap being positioned in an unlocked orientation. Latch tooth 18 of lever 11 is disengaged from strap tooth 10 of ratchet strap 9 when recess 14 of lock pin 4 is aligned with a portion of latch 11.

FIG. 3 illustrates lock mechanism 20 of lock housing 2 positioned in an unlocked configuration. For example, when key 16 is turned by an authorized user (not shown), lock cam 17 orients to receive a portion of lock jam ball 15. Resilient member 7 pushes lock pin 4. Recess 14 of lock pin 4 is aligned with a portion of latch 11.

Figure 4:
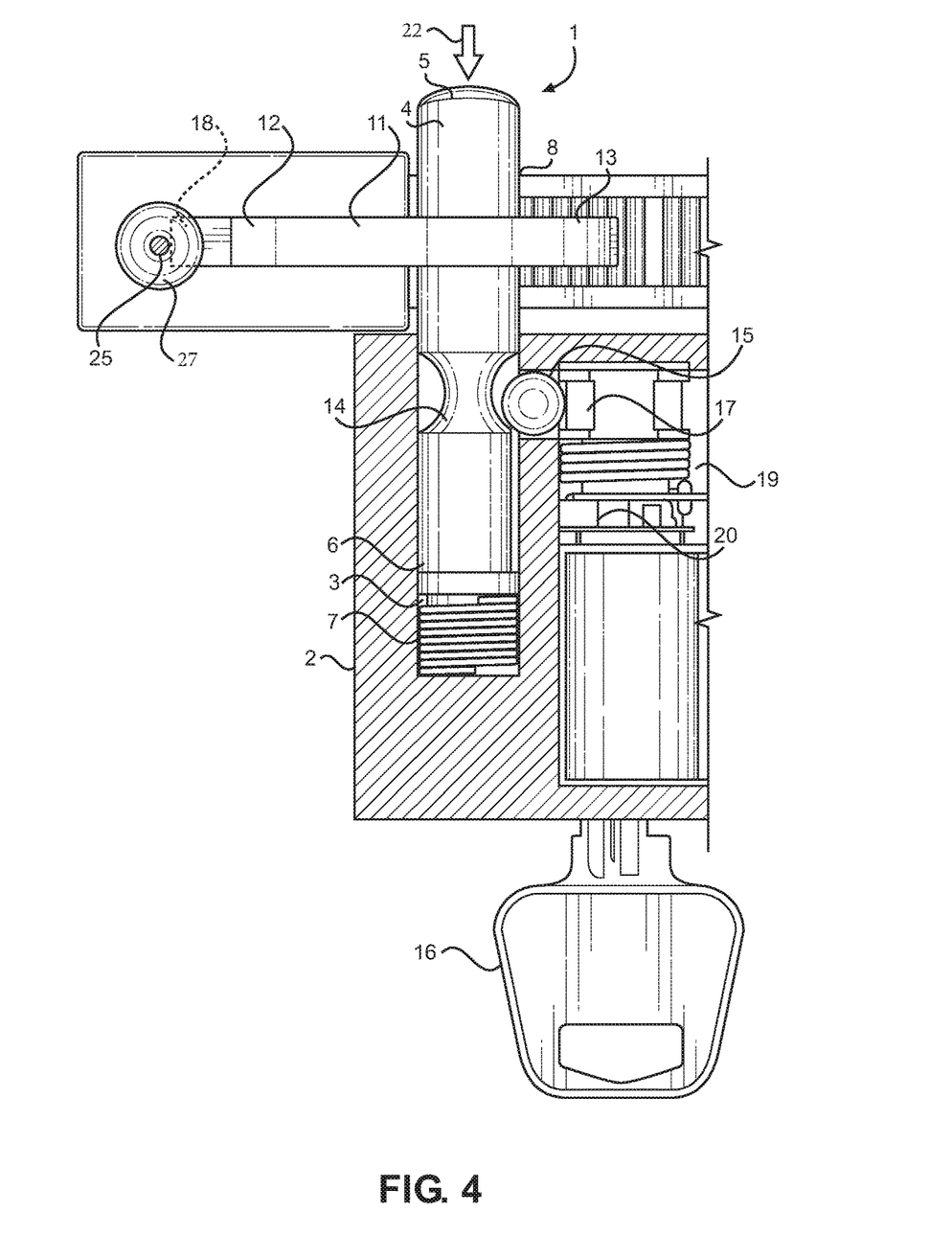
FIG. 4 is a top cut-away view of an alternate embodiment of the novel releasable ratchet strap having a lock mechanism positioned in a locked orientation.
Figure 5:
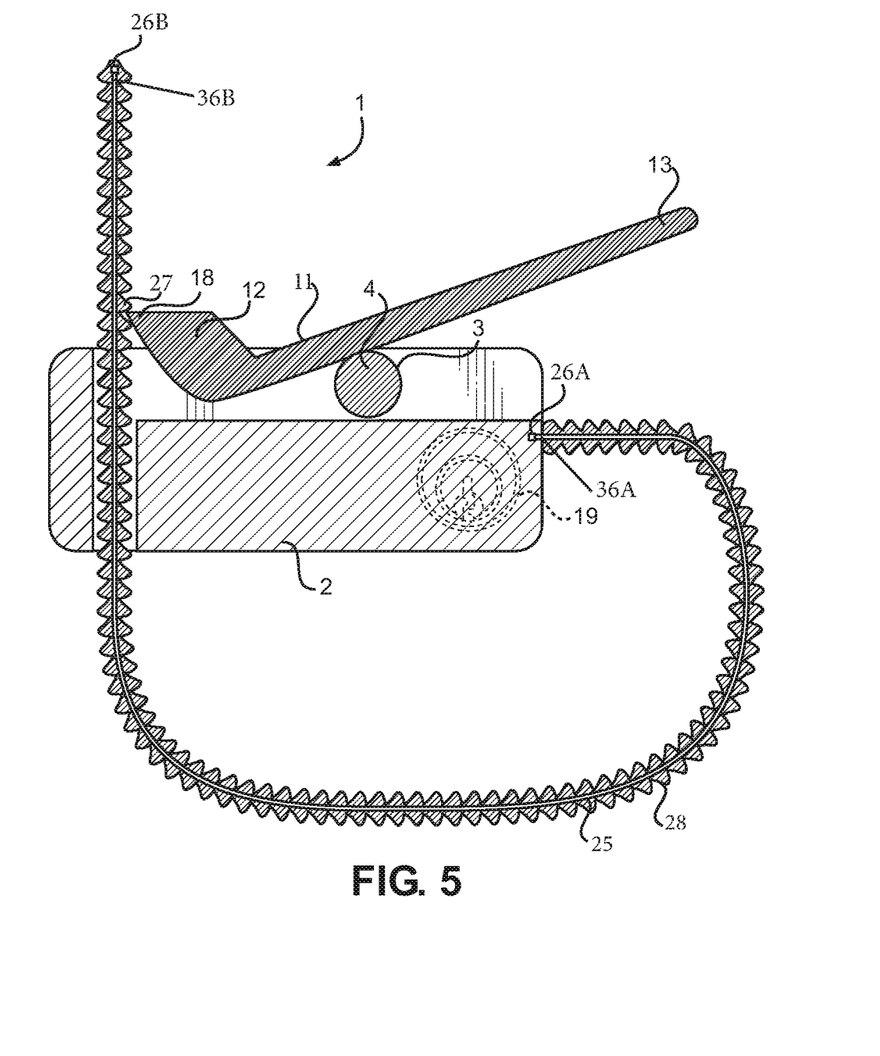
FIG. 5 is a side cut-away view of an alternate embodiment of the novel releasable ratchet strap having a lock mechanism positioned in a locked orientation.
Figure 6:
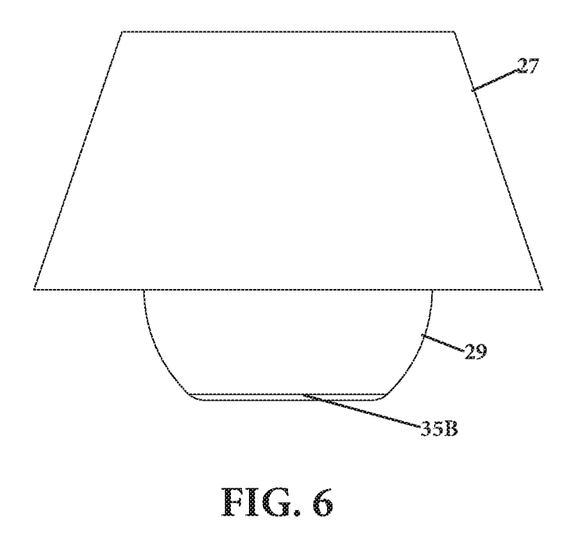
FIG. 6 is a side perspective view of an alternate embodiment of a segment of a strap tooth having an end with a convex protrusion.

FIGS. 4 and 5 illustrate an alternate embodiment of releasable ratchet strap having a lock mechanism 1. It is within the scope of this current invention for ratchet strap 28 (FIG. 5) to have a plurality of strap teeth 27 having an outer wall surface having a perimeter tapering from a larger perimeter to a smaller perimeter. It is within the scope of this invention for the ratchet strap to have a plurality of ridges on at least one side of the ratchet strap. It is within the scope of this invention for the ratchet strap to have a plurality of ridges around the perimeter of the ratchet strap. Ratchet strap 28 is made of a plurality of strap tooth segments 27.

Figure 7:
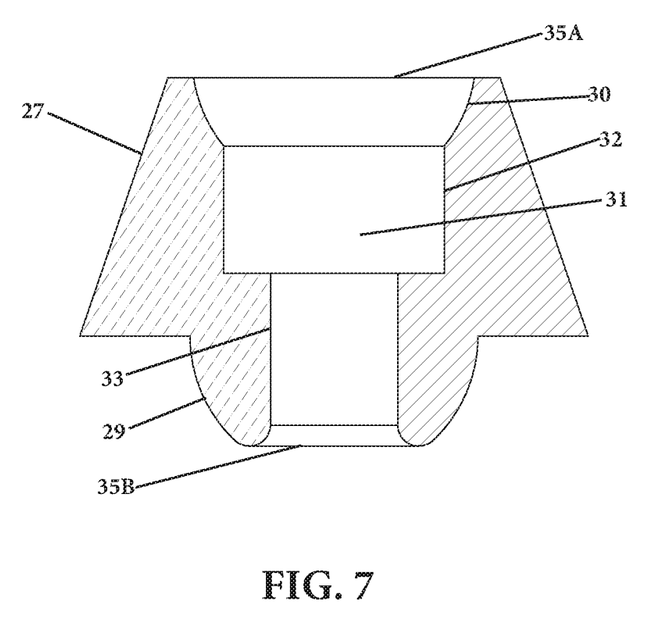
FIG. 7 is a side cut-away view of an alternate embodiment of a segment of a strap tooth having a central bore.

Ratchet strap 28 can have robust flexible inner core 25. Flexible inner core 25 has proximal end 36A located opposite distal end 36B. Proximal end 36A of flexible inner core 25 is connected to primary anchor structure 26A. Distal end 36B of flexible inner core 25 is connected to secondary anchor structure 26B. FIG. 7 illustrates secondary anchor structure 26B is configured to be retained in anchor structure compartment 32 of a strap tooth segment 27.

FIGS. 6-12 illustrate strap tooth segment 27 having an outer wall surface having a perimeter tapering from a larger perimeter to a smaller perimeter. FIGS. 6-7 and 9-12 illustrate strap tooth segment 27 having an end having a convex protrusion 29. Convex protrusion has secondary opening 35B.

Figure 8:
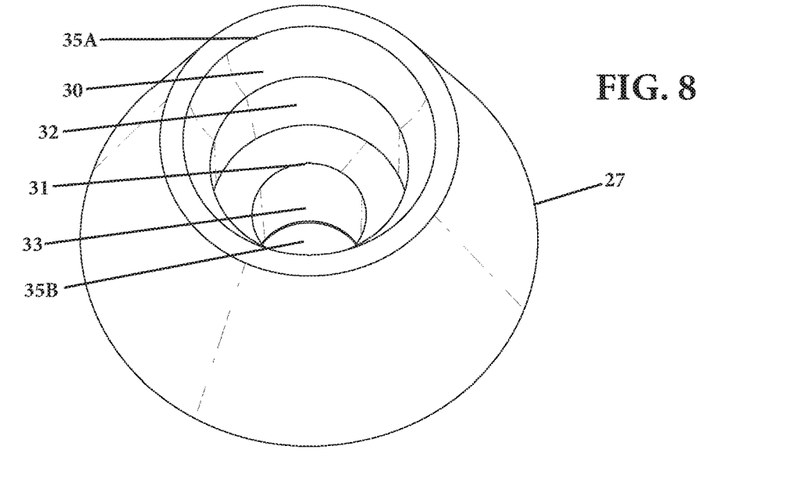
FIG. 8 is a top perspective view of an alternate embodiment of a segment of a strap tooth having a central bore.
Figure 9:
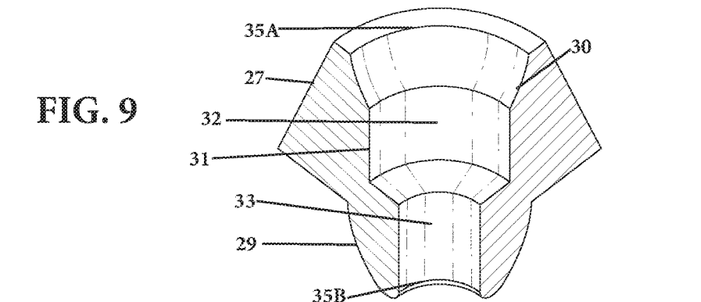
FIG. 9 is a partial cut-away view of an alternate embodiment of a segment of a strap tooth.

FIGS. 7-9 show strap tooth segment 27 having central bore 31 (FIGS. 7-9 and 12) having primary opening 35A located opposite secondary opening 35B. Strap tooth segment 27 has concave recess 30 retaining the convex protrusion of a second strap tooth segment (not shown). Anchor structure compartment 32 retains an anchor structure (not shown). Strap tooth segment 27 has robust flexible inner core compartment 33 retaining a portion of flexible inner core 25 (FIG. 5).

FIG. 5 shows a preferred embodiment of ratchet strap 28 having secondary anchor structure 26B located in the most distal strap tooth segment of the ratchet strap 28. Secondary anchor structure 26B retains the plurality of segments 27 of strap teeth onto flexible inner core 25.

Figure 10:
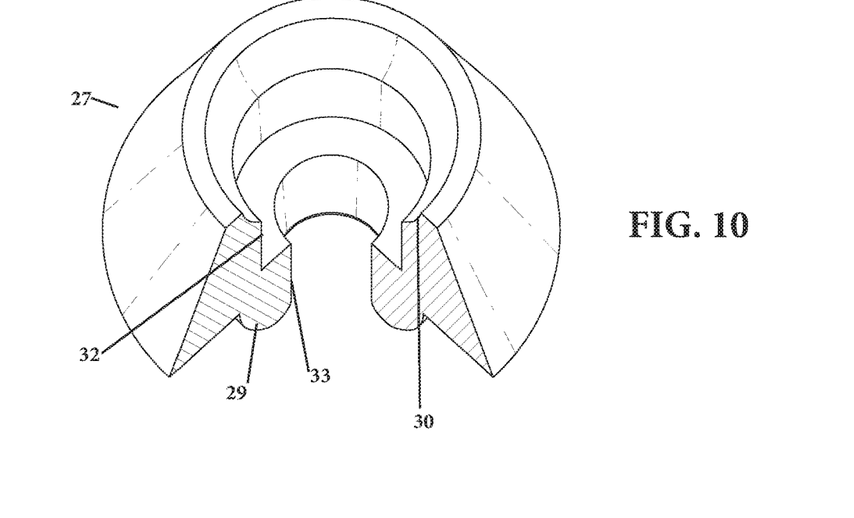
FIG. 10 is a partial cut-away view of an alternate embodiment of a segment of a strap tooth.
Figure 11:
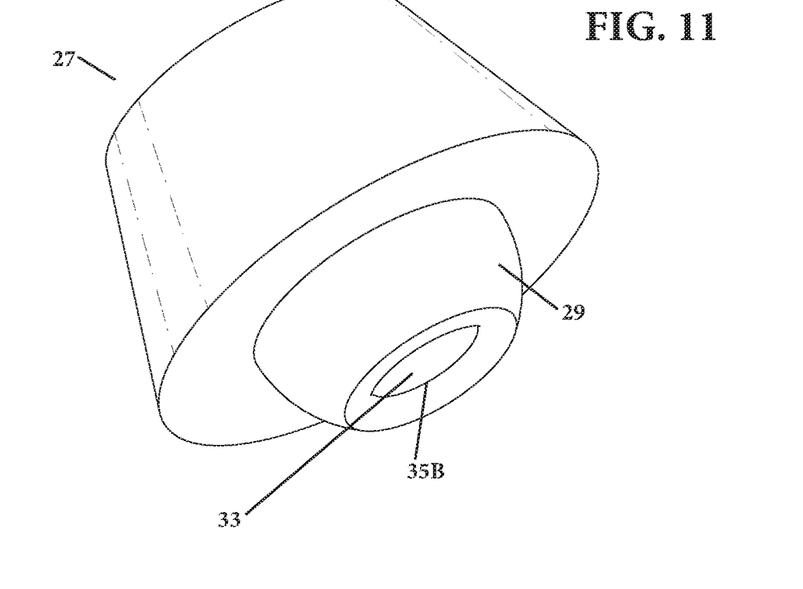
FIG. 11 is a rear perspective view of an alternate embodiment of a segment of a strap tooth having a central bore; and, FIG. 12 is a partial cut-away view of an alternate embodiment of a segment of a strap tooth having a central bore.
Figure 12:
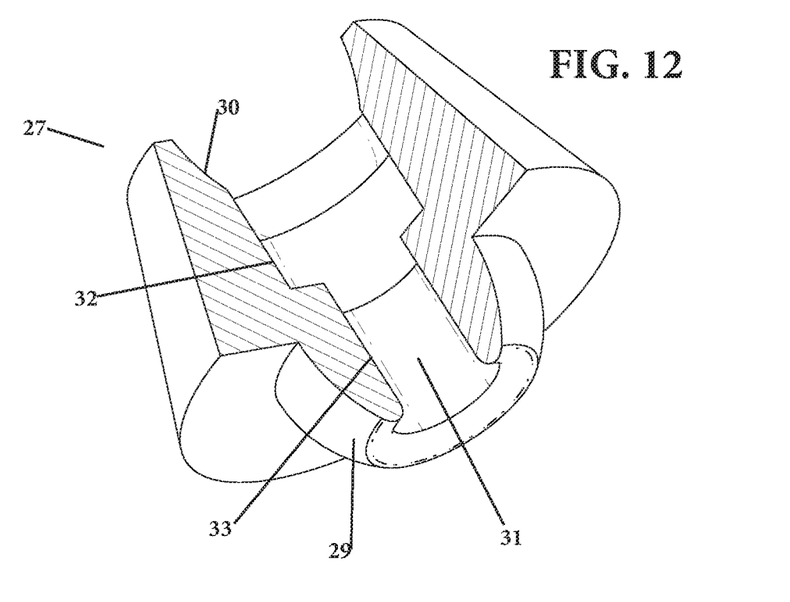

FIGS. 10 and 12 illustrate strap tooth segment 27 having concave recess 30, anchor structure compartment 32, and robust flexible inner core compartment 33(FIG. 10-12).

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described.

The invention claimed is:

1. A ratchet strap having a proximal end located opposite a distal end, comprising:
    at least one strap tooth, said at least one strap tooth is connected to said ratchet strap;
    a housing, said housing having a lock mechanism, said housing is connected to said proximal end of said ratchet strap, said housing having a compartment, said compartment of said housing retaining a lock pin, said compartment of said housing retaining a resilient member, said lock pin having a first end located opposite a second end, said lock pin having at least one recess located thereon said lock pin, said lock pin having a perimeter that is smaller in size at said at least one recess, said second end of said lock pin is in communication with said resilient member;
said compartment of said housing retaining a portion of a lock jam ball;
a lever, said lever is hingedly connected to said housing, said lever having a first end located opposite a second end, said first end of said lever having a latch tooth, said latch tooth is configured to engage at least one strap tooth, said latch tooth of said first end of said lever interlocks with said at least one strap tooth of said ratchet strap, said second end of said lever is configured for a user to depress said lever, said lock mechanism is oriented in a locked configuration when said latch tooth of said lever engages said at least one strap tooth of said ratchet strap, said at least one recess of said lock pin is not aligned with said lever;
said lock mechanism having a locked orientation when said lock jam ball is engaged within said at least one recess of said lock pin;
said lock mechanism having an unlocked orientation when a portion of said latch is located within said at least one recess of said lock pin; and,
a flexible inner core, said flexible inner core having a proximal end located opposite a distal end, said proximal end of said flexible inner core is connected to said housing.

2. The ratchet strap of claim 1, further comprising said strap tooth having a central bore, said central bore having an anchor structure compartment, said anchor structure compartment is configured to retain an anchor structure, said central bore having a flexible inner core compartment, said flexible inner core compartment is configured to retain a portion of said flexible inner core, said anchor structure compartment has a larger perimeter than said flexible inner core compartment.

3. The ratchet strap of claim 2, further comprising said distal end of said flexible inner core is connected to an anchor structure, whereby, said anchor structure is retained within said anchor structure compartment of said strap tooth.

4. The ratchet strap of claim 1, further comprising a distal end of a first ratchet strap is connected to a second ratchet strap, said second ratchet strap is non-releasable from said first ratchet strap.

5. The ratchet strap of claim 1, further comprising said ratchet strap having a plurality of strap teeth connected thereto.

6. The ratchet strap of claim 1, further comprising said strap tooth having an outer wall surface having a perimeter tapering from a larger perimeter to a smaller perimeter.

7. The ratchet strap of claim 1, further comprising said strap tooth having a convex protrusion located on an end of said strap tooth located opposite an end having a concave recess, said concave recess of a first strap tooth receives said convex protrusion of a second strap tooth, whereby, orienting said concave recess of said first strap tooth to engage said convex protrusion of said second strap tooth, thereby, forming a ball joint.

8. The ratchet strap of claim 1, further comprising said resilient member orienting said lock pin to traverse at least a portion of said compartment of said housing, whereby, said at least one recess of said lock pin is aligned with a portion of said lever, thereby, orienting said lock mechanism to be in an unlocked configuration when a portion of said lever is depressed and said latch tooth of said lever is released from contact with said strap tooth of said ratchet strap.

9. A ratchet strap having a proximal end located opposite a distal end, comprising:
at least one strap tooth, said at least one strap tooth is connected to said ratchet strap;
a housing, said housing having a lock mechanism, said housing is connected to said proximal end of said ratchet strap, said housing having a compartment, said compartment of said housing retaining a lock pin located thereon said lock pin, said lock pin having a perimeter that is smaller in size at said at least one recess, said compartment of said housing retaining a resilient member, said lock pin having a first end located opposite a second end, said lock pin having at least one recess, said second end of said lock pin is in communication with said resilient member;
said compartment of said housing retaining a portion of a lock jam ball;
said housing having a lever, said lever having a first end located opposite a second end, said first end of said lever having a latch tooth, said second end of said lever is configured for a user to depress said lever, said latch tooth of said first end of said lever interlocks with said at least one strap tooth of said ratchet strap, said lock mechanism is oriented in an unlocked configuration when said latch tooth of said lever is released from said at least one strap tooth of said ratchet strap, said at least one recess of said lock pin is aligned with said lever;
said lock mechanism having a locked orientation when said lock jam ball is engaged within said at least one recess of said lock pin;
said lock mechanism having an unlocked orientation when a portion of said latch is located within said at least one recess of said lock pin; and,
a flexible inner core, said flexible inner core having a proximal end located opposite a distal end, said proximal end of said flexible inner core is connected to said housing.

10. The ratchet strap of claim 9, further comprising said strap tooth having a central bore, said central bore having an anchor structure compartment, said anchor structure compartment is configured to retain an anchor structure, said central bore having a flexible inner core compartment, said flexible inner core compartment is configured to retain a portion of said flexible inner core, said anchor structure compartment has a larger perimeter than said flexible inner core compartment.

11. The ratchet strap of claim 10, further comprising said distal end of said flexible inner core is connected to an anchor structure, whereby, said anchor structure is retained within said anchor structure compartment of said strap tooth.

12. The ratchet strap of claim 9, further comprising a distal end of a first ratchet strap is connected to a second ratchet strap, said second ratchet strap is non-releasable from said first ratchet strap.

13. The ratchet strap of claim 9, further comprising said ratchet strap having a plurality of strap teeth connected thereto.

14. The ratchet strap of claim 9, further comprising said strap tooth having an outer wall surface having a perimeter tapering from a larger perimeter to a smaller perimeter.

15. The ratchet strap of claim 9, further comprising said strap tooth having a convex protrusion located on an end of said strap tooth located opposite an end having a concave recess, said concave recess of a first strap tooth receives said convex protrusion of a second strap tooth, whereby, orienting said concave recess of said first strap tooth to engage said convex protrusion of said second strap tooth, thereby, forming a ball joint.

16. The ratchet strap of claim 9, further comprising said resilient member orienting said lock pin to traverse at least a portion of said compartment of said housing, whereby, said at least one recess of said lock pin is not aligned with a portion of said lever, thereby, orienting said lock mechanism in a locked configuration when said latch tooth of said lever engages said strap tooth of said ratchet strap.

* * * * *